O. L. HUFFMAN.
TIRE.
APPLICATION FILED AUG. 5, 1918.

1,287,694.  Patented Dec. 17, 191

Inventor
O. L. Huffman
By Watson E. Coleman
Attorney

UNITED STATES PATENT OFFICE.

ORLA L. HUFFMAN, OF WEATHERFORD, TEXAS.

TIRE.

1,287,694.

Specification of Letters Patent.

Patented Dec. 17, 1918.

Application filed August 5, 1918. Serial No. 248,342.

*To all whom it may concern:*

Be it known that I, ORLA L. HUFFMAN, a citizen of the United States, residing at Weatherford, in the county of Parker and State of Texas, have invented certain new and useful Improvements in Tires, of which the following is a specification, reference being had to the accompanying drawings.

This invention relates to certain improvements in tires and it is an object of the invention to provide a tire with novel and improved means whereby the same is maintained in desired configuration with the necessary resiliency without requiring inflation.

It is also an object of the invention to provide a tire embodying a novel and improved core, preferably formed in section and which serves to maintain the casing in the proper form and whereby the casing is held against collapsing as a consequence of being punctured, and wherein the core serves to prevent the casing being rim-cut.

An additional object of the invention is to provide a device of this general character embodying a novel and improved core provided therethrough in a direction circumferentially of the tire and which opening is oval in cross section with its major axis radially disposed with reference to the wheel body to which the tire may be applied so that the pressure imposed upon the core will result in a lateral expansion thereof against the sides of the casing and whereby the tire is effectively held against displacement from the rim to which it may be applied.

The invention consists in the details of construction and in the combination and arrangement of the several parts of my improved tire whereby certain important advantages are attained and the device rendered simpler, less expensive and otherwise more convenient and advantageous for use, as will be hereinafter more fully set forth.

The novel features of my invention will hereinafter be definitely claimed.

Figure 1:
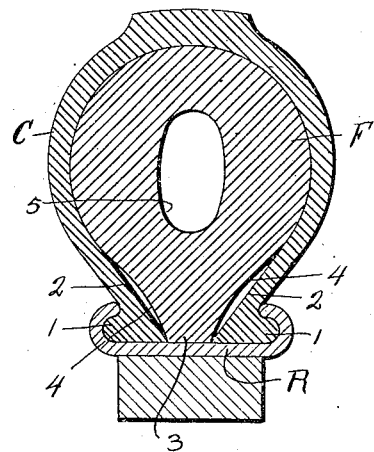
Figure 2:
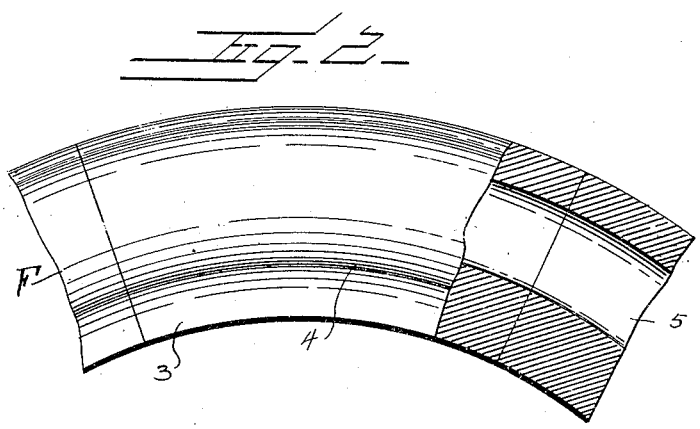

In order that my invention may be the better understood, I will now proceed to describe the same with reference to the accompanying drawings, wherein:

Figure 1 is a transverse sectional view illustrating a tire constructed in accordance with an embodiment of my invention and in applied position; and Fig. 2 is a fragmentary view partly in side elevation and partly in section of a filler or core as herein embodied.

As disclosed in the accompanying drawings C denotes the casing of my improved tire formed in any preferred manner and having its inner or free marginal portions provided with the outstanding beads 1 whereby the casing may be engaged in a well known manner with the rim R of a wheel body. The inner walls of the sides of the casing C in cross section, are substantially straight as indicated at 2 for a material distance inwardly of the margins of the casing and when the casing C is in applied position said portions 2 converge toward the rim R. When the casing C is in applied position the marginal portions of the casing are spaced apart as clearly indicated in Fig. 1 of the accompanying drawings.

F denotes the filler or core insertible within the casing C and said filler or core is preferably formed of sections of predetermined length. The filler or core F is formed of elastic material preferably rubber or rubber composition and the outer portion of the filler or core is of such configuration in cross section as to snugly fit within the outer or tread portion of the casing C. It is preferred that the outer portion of the filler or core F is circular in cross section and in excess of a semi-circle as is clearly indicated in the accompanying drawings. The inner side marginal portions of the filler or core F are substantially in convergence to afford a longitudinally disposed or circumferentially directed rib or shoulder 3 adapted to contact with the outer face of the rim R and of a width to snugly fit within the space between the inner marginal portions of the casing C. The inner side marginal portions are slightly concaved as indicated at 4 so that when the tire is free of load slight spaces are afforded between the inner side marginal portions of the filler or core F and the adjacent side walls of the casing C. Disposed through the filler or core F at substantially the axial center of the rounded outer portion thereof is an opening 5 substantially oval in cross section with its major axis extending in a direction substantially radial of the wheel body to which the tire is applied.

The resiliency possessed by the filler or core F serves to maintain the casing C properly extended when the tire is in applied position and said filler or core possesses sufficient elasticity to cause the casing to properly stand out against the load imposed thereupon. It is to be understood, however, that there will be a slight depression of the casing when under load and the particular cross sectional configuration and positioning of the opening 6 will result in a lateral expansion of a filler or core F with a consequent pressure outwardly upon the side walls of the casing C and whereby the tire is effectively maintained against displacement from the rim R as will be clearly apparent to those skilled in the art to which my invention appertains. The resultant lateral expansion of the filler or core F is further facilitated by the concaved marginal portions 4 and for which reason these inbows 4, in practice, have been found of utmost importance and advantage.

By having the filler or core F substantially snugly fitting within the casing C and the rib or shoulder 3 contacting with the rim R, the possibility of the casing C becoming rim-cut is eliminated.

From the foregoing description, it is thought to be obvious that a tire constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A tire comprising a casing, a core insertible therein, the outer portion of the core snugly fitting in the tread portion of the casing, the inner portion of the core having a rib extending between the free marginal portions of the casing, the inner side marginal portions of the core being spaced from the adjacent sides of the casing when the tire is free of load and contacting with the casing when the tire is under load thereby preventing rim cutting of the casing.

2. A tire comprising a casing, a core insertible therein, the outer portion of the core snugly fitting in the tread portion of the casing, the inner portion of the core having a rib extending between the free marginal portions of the casing, the opposite side marginal portions of the core and rib being provided with inbows, the walls of said inbows contacting with the casing when the tire is under load whereby the core prevents rim cutting of the casing.

In testimony whereof I hereunto affix my signature in the presence of two witnesses.

ORLA L. HUFFMAN.

Witnesses:
G. E. LOWE,
H. C. SHAPSHIRE.